United States Patent Office 3,288,679
Patented Nov. 29, 1966

3,288,679
STEROIDAL COMPOSITIONS AND
METHOD OF USE
Josef Fried, Chicago, Ill., and Aleck Borman, East Brunswick, N.J., assignors to E. R. Squibb & Sons Inc., New York, N.Y., a corporation of Delaware
No Drawing. Filed Mar. 23, 1966, Ser. No. 536,632
10 Claims. (Cl. 167—74)

This application is a continuation-in-part of our application Serial No. 267,825, filed March 25, 1963, now abandoned, which in turn is a continuation-in-part of our application Serial No. 775,388, filed November 21, 1958, now abandoned.

This invention relates to new compositions of matter; more particularly to physiologically active compositions possessing progestational activity containing, as one of the active ingredients, a steroid of the general formula

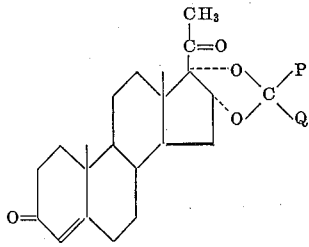

wherein P is lower alkyl, Q is hydrogen or lower alkyl or together P and Q is alkylene of less than ten carbon atoms.

These compounds can be prepared by interacting 16α,17a-dihydroxyprogesterone with an aldehyde or ketone of the general formula:

wherein P and Q are as hereinbefore defined, and recovering the resultant acetal or ketal derivative. The reaction is preferably carried out by treating a suspension or solution of the steroid in the aldehyde or ketone (or an organic solvent if the aldehyde or ketone is a solid) with an acid catalyst (e.g., perchloric acid, p-toluene sulfonic acid and hydrochloric acid), neutralizing the acid, and recovering the acetal, ketal or alkylidene derivative formed.

The steroids utilized in the compositions of this invention comprise such steroids as the 16α,17α-acetal and ketal derivatives of 16α,17α-dihydroxyprogesterone, with an aldehyde of at least two carbon atoms, such as a lower alkanal, e.g., paraldehyde, propanal and hexanal; or with a ketone, such as a di(lower alkyl)ketone, e.g., acetone, diethyl ketone, dibutyl ketone, methylethylketone, and methylisobutylketone or a cycloalkanone of less than eleven carbon atoms (e.g., cyclopentanone, cyclohexanone, suberone and cyclodexanone).

The compositions of this invention comprise: (I) a steroid of the general formula given above; and (II) a physiologically inert pharmaceutical carrier, the steroid being present in a concentration of at least about 0.3%. The compositions of this invention possess progestational activity and hence can be used in the treatment of mammals, such as dogs and cats, for such conditions as have been previously successfully treated with compositions containing a progestational steroid.

The compositions of this invention include parenterally and perorally acceptable compositions. The peroral compositions are administered so as to give a daily dosage of steroid of about 10 mg. to about 500 mg., the upper limit being used for initial medication. Parenteral compositions are administered at suitable intervals (3 to 30 days) the individual dosage amounting to about 10 mg. to about 500 mg.

Perorally acceptable formulations can be prepared in the usual manner to provide a solid dosage-unit form (e.g., tablet, powder or capsule). For example, two-piece hard gelatin capsules may be filled with a mixture of the desired steroid and physiologically inert excipients (e.g., starch, talc, stearic acid, and/or magnesium stearate), the steroid being present in an amount of the order of about 10 to about 500 mg. (preferably about 50 mg. to about 300 mg.) per capsule. Tablets may be prepared to contain the same order of medicament by using starch, lactose or other conventional physiologically inert, excipients, and may be scored to enable one to take fractional dosages, if desired. Any of the tableting materials used in pharmaceutical practice may be employed where there is no incompatibility with the particular steroid.

Parenteral formulations can be prepared in the usual manner to provide either sterile aqueous suspensions or sterile oil-based solutions of the medicaments of this invention. For example, an aqueous suspension can be formed by mixing the steroid with water in such proportions that a dose of steroid in the order of about 10 to about 200 mg. per ml. of the final composition is achieved, and sterilizing the mixture.

The following examples illustrate suitable compositions of this invention:

EXAMPLE 1

*Tablets containing 16α,17α-dihydroxyprogesterone acetonide*

(a) To a solution of 175 mg. of 16α,17α-dihydroxyprogesterone in 10 ml. of warm acetone is added 2 drops of concentrated hydrochloric acid. After 15 hours at room temperature the mixture is poured into water, neutralized with dilute sodium bicarbonate and the resulting crystals removed. The dried material represents pure 16α,17α-dihydroxyprogesterone acetonide, M.P. about 208–209° C.;

$\lambda_{Max.}^{Nujol}$ 5.83, 5.95, 6.19 m$\mu$.

[In place of the hydrochloric acid used above, 70% perchloric acid can be employed as follows: To a suspension of 740 mg. of 16α,17α-dihydroxyprogesterone in 37 ml. of acetone is added .025 ml. of 70% perchloric acid. The solution clears within 2 minutes and the reaction is allowed to proceed for a total of one hour. The crystalline acetonide is recovered as described above.]

(b) To prepare 100 tablets, each containing 50 mg. of isopropylidenedioxyprogesterone, the following ingredients are used:

| | G. |
|---|---|
| 16α,17α-isopropylidenedioxyprogesterone | 5.0 |
| Dicalcium phosphate | 3.6 |
| Lactose | 6.0 |
| Corn starch | 1.8 |
| Granulating paste (corn starch in water, 11% in weight) | 0.2 |
| Distilled water | 2.3 |
| Talc | 0.3 |
| Magnesium stearate | 0.04 |

A tablet granulation is prepared from these ingredients by passing the steroid through a 100-mesh screen, the dicalcium phosphate, lactose and corn starch are passed through a 60-mesh screen; the screened materials are intermixed; the granulating paste and sufficient water are worked in to give a pasty consistency, and the material passed through a large mesh (e.g., No. 16) screen to produce granules. The granules are tray dried at 130° F. for three hours; and the dry granulation is put through a No. 20 (to 24) screen and mixed with the previously sieved talc and magnesium stearate. The resulting granulation is compressed into tablets, each containing about one mg. of steroid.

In a similar manner all other steroids within the purview of this invention may be tableted.

EXAMPLE 2

*Capsules of the methylisobutyl ketone derivative of 16α,17α-dihydroxyprogesterone*

(a) To a suspension of 500 mg. of 16α,17α-dihydroxyprogesterone in 50 ml. of methylisobutyl ketone is added .2 ml. of 70% perchloric acid. The suspension clears within three minutes and the reaction is allowed to proceed for a total of one and one-half hours. The mixture is neutralized by the addition of dilute sodium bicarbonate solution and after the addition of water the phases are separated. The methylisobutyl ketone phase is dried over sodium sulfate and the solvents evaporated in vacuo. The residual crystals upon recrystallization from acetone-hexane furnish the pure methylisobutyl ketone derivative of the following properties: M.P. about 168–169° C., $$\lambda_{Max.}^{Nujol} \; 5.84, \; 5.95, \; 6.19 \; m\mu.$$

*Analysis.*—Calcd. for $C_{27}H_{40}O_4$ (428.59): C, 75.66; H, 9.41. Found: C, 75.79; H, 9.63.

(b) The following ingredients are for the preparation of 100 dry-filled capsules, each containing 100 mg. of the methylisobutyl ketone derivative of 16α,17α-dihydroxyprogesterone:

| | G. |
|---|---|
| Methylisobutyl ketone derivative | 10.0 |
| Lactose | 75.0 |
| Magnesium stearate | 0.8 |

These ingredients are uniformly intermixed in the manner known in the art and filled into two-piece hard gelatin capsules to provide capsules each containing 100 mg. of steroid.

Similarly, all other steroids within the purview of this invention may be tableted or capsulated.

EXAMPLE 3

*Aqueous suspension of the methylethyl ketone derivative of 16α,17α-dihydroxyprogesterone*

(a) To a suspension of 500 mg. of 16α,17α-dihydroxyprogesterone in 24 ml. of methylethyl ketone is added .016 ml. of 70% perchloric acid. The reaction is allowed to proceed at room temperature with stirring for forty minutes at which time the solution is neutralized by the addition of dilute sodium bicarbonate solution. Water is added and the mixture is extracted with chloroform. The chloroform extract is dried over sodium sulfate, the solvent removed in vacuo, and the crystalline residue recrystallized from 95% alcohol. The pure methylethyl-ketone derivative has the following properties: M.P. about 175–176° C., $[\alpha]_D^{23°} \; +106°$ (c., 1.14 in chloroform), $$\lambda_{max.}^{alc.} \; 239 \; m\mu \; (\epsilon = 17{,}500) \lambda_{Max.}^{Nujol} \; 5.85, \; 5.97, \; 6.20 \; m\mu.$$

*Analysis.*—Calcd. for $C_{25}H_{36}O_4$ (400.54): C, 74.96; H, 9.06. Found: C, 75.01; H, 9.99.

(b) The following ingredients are for the preparation of an aqueous sterile suspension of the methylethyl ketone derivative of 16α,17α-dihydroxyprogesterone providing an effective dose of 50 mg. of the steroid per ml. of suspension:

| | G. |
|---|---|
| Methylethyl ketone derivative | 50.0 |
| Benzyl alcohol | 9.0 |
| Sodium chloride | 6.6 |
| Carboxymethylcellulose | 5.5 |
| Methylcellulose | 0.75 |

Water, q.s., 1.0 liter.

In preparing the composition, the sodium chloride, carboxymethylcellulose and methylcellulose are added to 100 cc. of water with attendant stirring. The methylethyl ketone derivative of 16α,17α-dihydroxyprogesterone and benzyl alcohol are then added with accompanying agitation. Sufficient water is then added to bring the volume to one liter. The resultant suspension is then metered into vials of selected size, as for example 10 cc. vials, from which the suspension can be withdrawn for therapeutic application by intramuscular administration.

EXAMPLE 4

*Solutions of 16α,17α-isopropylidenedioxyprogesterone*

The following ingredients are used:

| | |
|---|---|
| 16α,17α-isopropylidene dioxyprogesterone | 200 mg./ml. |
| Benzyl alcohol | 2% w./v. |
| Benzyl benzoate, q.s. | |

The steroid is added to 80% of the required benzyl benzoate with stirring and the temperature raised to 40–50° C. The benzyl alcohol is added and the mixture stirred until solution is attained. Benzyl benzoate is added to bring the solution to final volume.

The solution is clarified by passing through an asbestos pad followed by a coarse sintered glass filter. The solution is finally filled into containers, the containers sealed, and the units autoclaved for two hours at 121° C. to sterilize.

EXAMPLE 5

*Solutions of 16α,17α-isopropylidenedioxyprogesterone*

The following ingredients are used:

| | |
|---|---|
| 16α,17α-isopropylidenedioxyprogesterone | 100 mg./ml. |
| Benzyl benzoate | 30% v./v. |
| Benzyl alcohol | 2% w./v. |
| Castor oil, q.s. | |

The steroid is added to the benzyl benzoate with stirring. The benzyl alcohol and castor oil are added, the temperature raised to 50–55° C., and stirring continued until solution is complete.

At the same temperature, the solution is passed through an asbestos pad followed by a coarse sintered glass filter. The filtered solution is then filled into vials and sealed and the containers heated in an autoclave for two hours at 121° C. to sterilize.

EXAMPLE 6

*Solutions of 16α,17α-ethylidenedioxyprogesterone*

The following ingredients are used:

| | |
|---|---|
| 16α,17α-ethylidenedioxyprogesterone | 125 mg./ml. |
| Benzyl benzoate | 35% v./v. |
| Benzyl alcohol | 2% w./v. |
| Sesame oil, q.s. | |

The steroid is added to the benzyl benzoate with stirring. The benzyl alcohol and sesame oil are added, the temperature raised to 50–55° C., and stirring continued until solution is complete.

At the same temperature, the solution is passed through an asbestos pad followed by a coarse sintered glass filter. The filtered solution is then filtered into containers and sealed, and the containers heated in an autoclave for two hours at 121° C. to sterilize.

By substituting other alkanals and alkanones for the specific ketones in Examples 1 through 6, the corresponding 16α,17α-acetal and ketal derivatives are formed. Thus, acetaldehyde and cyclohexanone yield the respective 16α,17α-ethylidene and 16α,17α-cyclohexylidene derivatives.

The fact that the compositions of this invention possess progestational activity is surprising in view of the fact that the starting 16α,17α-dihydroxyprogesterone, from which the medicaments of the present invention are prepared, is inactive as a progestagen (Fried et al., Chemistry and Industry, April 15, 1961, pages 465 and 466). However, as shown in this article, when tested by the Clauberg Assay (the standard test for progestational agents), 16α,17α-isopropylidenedioxyprogesterone was found to possess the same to twice the activity of progesterone; the methyl ethyl ketone derivative was found to possess 0.25 to 0.5 the activity of progesterone; the methyl isobutyl ketone derivative was found to possess one-half to the same activity of progesterone; and the 16α,17α-ethylidene derivative was shown to possess four times the activity of progesterone.

The invention may be variously otherwise embodied within the scope of the appended claims.

What is claimed is:

1. A composition for use as a progestational agent comprising: (I) a substantial amount of an orally-acceptable pharmaceutical carrier; and (II) a steroid of the general formula

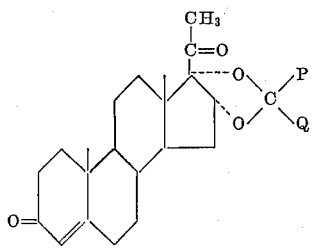

wherein P is lower alkyl, Q is selected from the class consisting of hydrogen and lower alkyl, and together P and Q is alkylene of less than ten carbon atoms.

2. The composition of claim 1, wherein the steroid is 16α,17α-isopropylidenedioxyprogesterone.
3. The composition of claim 1, wherein the steroid is the methylisobutyl ketone derivative of 16α,17α-dihydroxyprogesterone.
4. The composition of claim 1, wherein the steroid is the methylethyl ketone derivative of 16α,17α-dihydroxyprogesterone.
5. The composition of claim 1 in a dosage-unit form.
6. The composition of claim 5 wherein each unit contains from about 10 to about 500 mg. of steroid.
7. The composition of claim 6 in tablet form.
8. The composition of claim 6 in capsule form.
9. A composition for use as a progestational agent comprising (I) a substantial amount of a sterile parenterally-acceptable liquid pharmaceutical carrier; and (II) a steroid of the general formula

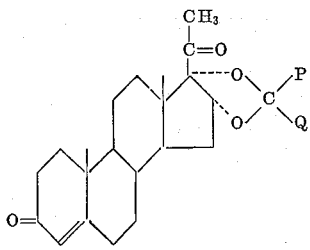

wherein P and Q are as defined in claim 1, the steroid being present in a concentration of at least 0.3% of the total composition.

10. A method for treating conditions requiring the use of a progestational agent, which comprises administering to a mammal a steroid of claim 1.

References Cited by the Examiner
FOREIGN PATENTS
715,402   2/1952   Great Britain.

OTHER REFERENCES
Cooley et al.; Journal of the Chemical Society for 1955, pages 4373, 4374, 4376, 4377, 4379, 4380, 4383, and 4385.

SAM ROSEN, *Primary Examiner*.

LEROY B. RANDALL, *Assistant Examiner*.

UNITED STATES PATENT OFFICE
CERTIFICATE OF CORRECTION

Patent No. 3,288,679                                  November 29, 1966

Josef Fried et al.

It is hereby certified that error appears in the above numbered patent requiring correction and that the said Letters Patent should read as corrected below.

Column 5, lines 12 and 13, for "an orally-acceptable" read -- a solid orally-acceptable --.

Signed and sealed this 12th day of September 1967.

(SEAL)
Attest:

ERNEST W. SWIDER                              EDWARD J. BRENNER
Attesting Officer                                    Commissioner of Patents